Dec. 11, 1956  W. F. KING  2,773,389
BALANCING MACHINE INDICATOR
Filed March 15, 1951
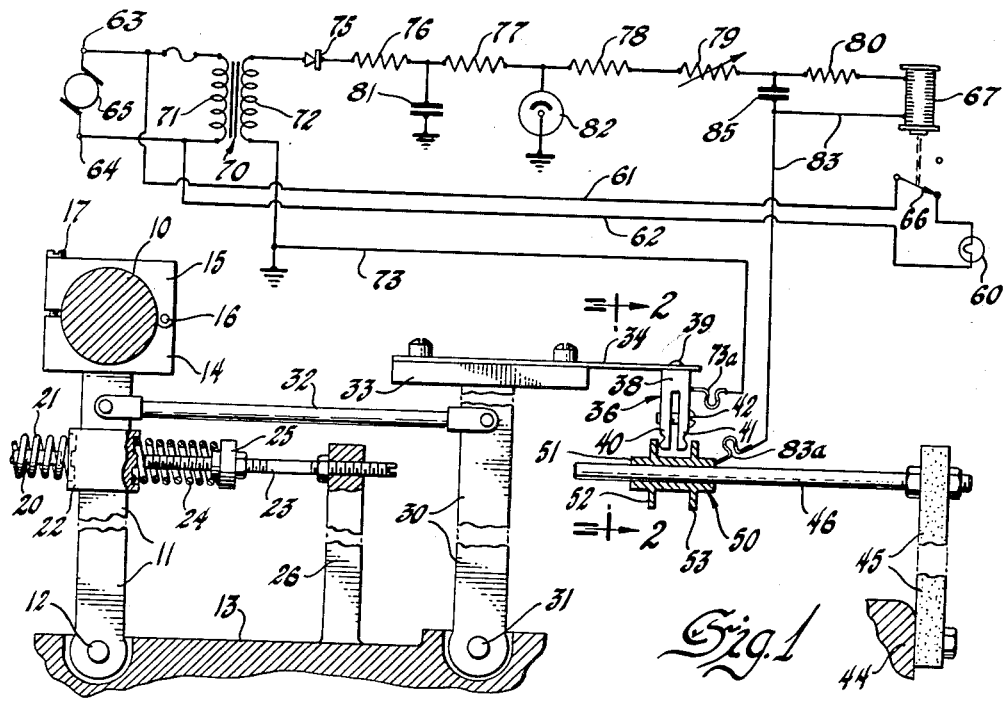
Fig. 1
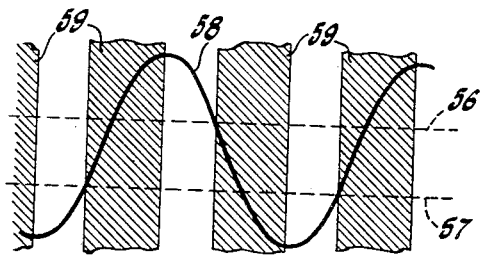
Fig. 3
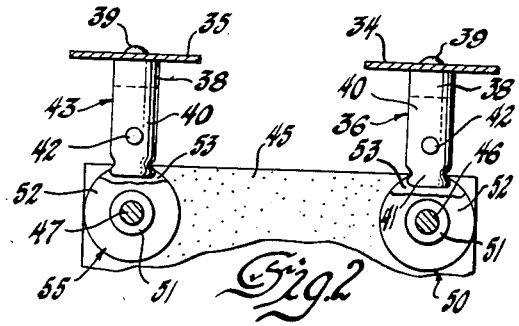
Fig. 2
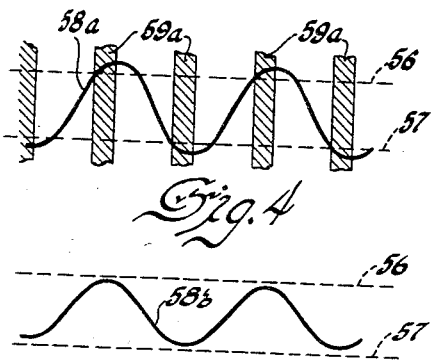
Fig. 4
Fig. 5
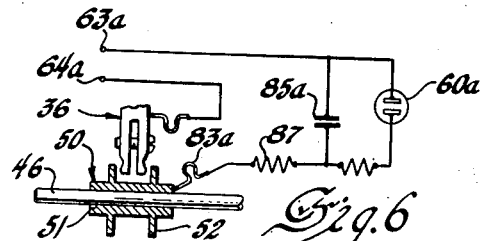
Fig. 6
Inventor
William F. King
By Willits, Helmig & Baillio
Attorneys

United States Patent Office 2,773,389
Patented Dec. 11, 1956

2,773,389

BALANCING MACHINE INDICATOR

William F. King, Royal Oak, Mich., assignor to General Motors Corporation, Detroit, Mich., a corporation of Delaware Application March 15, 1951, Serial No. 215,715

9 Claims. (Cl. 73—462)

This invention relates to a balancing machine indicator, and more particularly to an apparatus for indicating conditions of operation in a balancing machine having a maximum unbalance tolerance.

One feature of the invention is that it provides an improved apparatus for indicating conditions of operation in a balancing machine; another feature of the invention is that it provides improved apparatus including indicating means and means for operating said indicating means to indicate unbalance in excess of maximum unbalance tolerance; a further feature of the invention is that it provides means for operating said indicating means to provide a different indication of unbalance conditions which closely approach maximum unbalance tolerance; still another feature of the invention is that it provides indicating means, a circuit including switch means for energizing said indicating means, switch operating means, and an actuating circuit for the operating means including movable contact means having a portion which is movable in accordance with the amount of unbalance in the operation of the balancing machine to close the actuating circuit periodically for time durations proportionate to the amount of unbalance; yet a further feature of the invention is that it provides an electrical storage device connected to the actuating circuit to control the operation of the switch operating means as a function of the time percentage during which said actuating circuit is closed; and an additional feature of the invention is that it provides novel contact means having a first reciprocable contact in the actuating circuit adapted to be connected to the balancing machine for reciprocation in accordance with the amount of unbalance in the operation thereof, and a second reciprocable contact in said actuating circuit having spaced portions straddling said first contact and in the path of movement thereof, the distance between said spaced portions being greater than the width of the said first contact in an amount slightly less than the distance the first contact moves due to maximum unbalance tolerance in the operation of the balancing machine.

Other features and advantages of the invention will be apparent from the following description, and from the drawings in which:

Fig. 1 is a diagrammatic representation of the improved apparatus in use with a balancing or mass centering machine, the electrical apparatus being shown schematically and the machine being shown fragmentarily; Fig. 2 is a vertical section along the line 2—2 of Fig. 1; Fig. 3 is a graphic representataion illustrating the operation of the device for a condition considerably in excess of maximum unbalance tolerance; Fig. 4 is a graphic representation illustrating the operation of the device for a condition in excess of, but closely approaching, maximum unbalance tolerance; Fig. 5 is a graphic representation illustrating the operation of the device for a condition of operation within maximum unbalance tolerance; and Fig. 6 is a diagrammatic representation of a modified form of the invention.

I have devised, and am herein disclosing and claiming, improved apparatus for indicating conditions of operation in a balancing machine. The novel apparatus provides one indication when maximum unbalance tolerance is exceeded by a substantial amount and a different indication when maximum unbalance tolerance limits are closely approached. The apparatus may be used for supervisory quality control to insure that parts are within maximum unbalance tolerance limits, and the apparatus may be used in production testing to aid the balancing machine operator to quickly determine when parts are within unbalance tolerance limits.

Referring now more particularly to the drawings, the main spindle of a balancing machine, mass centering machine, or the like, is designated at 10 in Fig. 1. During operation of the machine this spindle rotates, any unbalance in the work piece under test imparting an elliptical or eccentric component of motion to the spindle 10. An arm 11 is mounted for pivotal movement about an axis 12 secured to a support 13. The arm 11 carries a lower housing portion 14, and a complementary housing portion 15 is pivotally mounted at one side of the housing portion 14 by means of a pin 16, the complementary housing portions providing a bore adapted to rotatably receive the spindle 10. An adjusting bolt 17 is provided to take up any slack to insure a close rotatable fit of the spindle 10 in the bore of the housing, so that any eccentric component of motion of the spindle 10 will be imparted to the arm 11 to oscillate said arm through an arc about the axis 12.

A zero-balance adjustment means comprises a stud 20 surrounded by a spring 21 abutting one side of a collar 22 on the arm 11, and a stud 23 surrounded by a spring 24 abutting said collar at the other side of the arm 11. The stud 23 has threaded thereon a nut 25 which abuts the other end of the spring 24 to vary the tension of the spring and provide for zero adjustment. The stud 23 is carried by a bracket 26 projecting from the surface 13. Stud 20 and spring 21 are similarly mounted. The operation of the balancing or mass centering machine above described is conventional.

An arm 30 is pivotally mounted on the support 13 for rocking movement about an axis 31, this arm being so proportioned, if desired, as to provide for multiplication of the reciprocal movement of the arm 11. While a portion of the arm 30 is broken away, it will be understood that the arm may be of such length as to provide any desired multiplication of motion in accordance with well understood principals of levers. A link 32 interconnects the arms 11 and 30, the opposite ends of the link being pivotally connected to the respective arms.

It will be understood that, if no motion multiplication is desired, the arm 30 and link 32 may be omitted and the contact apparatus to be hereinafter described may be connected directly to the arm 11.

The arm 30 terminates in a table or bracket 33 upon which is mounted a support finger 34 (Figs. 1 and 2) extending from the table 33. At the end of the finger 34 is mounted a primary contact designated generally as 36, this contact being preferably circular in transverse section and being formed as an inverted U having a base portion 38 which is secured to the finger 34 by means of a screw 39, and having spaced parallel legs 40 and 41. The legs 40 and 41 are provided with aligned transverse apertures, the aperture in leg 40 being threaded for an adjusting screw 42 by means of which the distance between the free ends of the legs 40 and 41 may be adjusted to change the width of the contact. A similar primary contact designated generally as 43 projects from the end of a finger 35, which finger projects from another table (not shown). This other table may be similar to the table 33 and may be connected by linkage apparatus to the balancing machine. The contacts 36 and 43 are reciprocable in accordance with the amount of the unbalance in the operation of the balancing machine, the amount of reciprocating movement being proportional to the amount of unbalance in a ratio dependent upon the motion multiplication provided by the linkage system including link 32 and lever arms 11 and 30.

A supporting table 44 has bolted thereto a bracket 45 upon which is mounted a pair of rods 46 and 47, these rods projecting in the direction of the line of movement of the contacts 36 and 43 and extending directly below and closely adjacent the free ends of said contacts. A secondary contact designated generally at 50 is slidably mounted on the rod 46 for movement therealong. The contact 50 has a body portion 51 with a bore for slidably receiving the rod 46, and the body is provided with a pair of spaced radially projecting flanges 52 and 53 which straddle the primary contact 36 and lie in the path of reciprocation thereof. The distance between the spaced flanges 52 and 53 of the secondary contact 50 is greater than the width of the primary contact 36 (at its free end) in an amount slightly less than the distance the contact 36 moves due to maximum unbalance tolerance in the operation of the balancing machine. In one embodiment of the invention the motion of contact 36 is of the order of .002 inch and the spacing between the inner surfaces of the flanges 52 and 53 is of the order of .0002 inch less than the width of contact 36 plus the .002 inch motion.

Another secondary contact designated generally at 55 is slidably mounted on the rod 47, this last mentioned contact being similar to contact 50 and cooperating with reciprocating contact 43.

Inasmuch as the operation of that portion of the apparatus associated with the contacts 43, 55 is similar to the operation of that portion of the apparatus associated with contacts 36, 50, only the structure associated with the later contacts will be described in detail. Contacts 36, 50 may be utilized to provide an indication of operating conditions at one end of the machine and contacts 43, 55 may be utilized to provide an indication of operating conditions at the other end of the machine, similar linkages and circuits being provided for the respective contact pins at opposite ends of the machine.

Since the spacing of flanges 52 and 53 of contact 50 is greater than the width of contact 36 in an amount slightly less than the distance contact 36 moves, upon reciprocation of contact 36 during operation of the balancing machine the contacts will be in engagement with each other for a portion of the time and out of engagement with each other for a portion of the time if the unbalance exceeds the maximum unbalance tolerance. The ratio of the engaged time to the total time will depend upon the amount of movement of contact 36—i. e. the amount of unbalance—and contact 50 will automatically center itself in accordance with the movement of contact 36.

Fig. 3 shows graphically the condition of operation for unbalance considerably in excess of the limits of unbalance tolerance. In Fig. 3 the space between broken lines 56 and 57 represents the amplitude of reciprocation of the contact 36 under conditions of maximum permissible unbalance. The line 58 represents the motion of contact 36, and the shaded areas 59 represent the time that contacts 36 and 50 are in engagement, this time of engagement being of the order of 61% of the total time under conditions represented in the graph of Fig. 3. Reading from the left of Fig. 3 as the contact 36 starts its motion in one direction it will move out of engagement with one of the flanges of the contact 50. After contact 36 moves a distance less than the maximum unbalance tolerance limit it will engage the other flange of contact 50, and during the remainder of the movement in the same direction contact 36 will remain in engagement with contact 50 and will cause contact 50 to slide along the bar 46. When contact 36 starts to move in the other direction it will immediately move out of engagement with the flange portion of contact 50 until it again engages the other flange portion thereof, and during the remainder of movement in the same direction contact 36 will carry contact 50 along with it.

Fig. 4 shows a condition of operation in which the movement of contact 36 (designated at 58a) is only slightly in excess of the limit of movement permitted under maximum unbalance tolerance limits. Under these conditions the time (59a) during which the contacts 36 and 50 are in engagement is a much lower proportion of the total time than under the conditions illustrated in Fig. 3. In Fig. 4 the unbalance is of the order of 1.2 times the maximum unbalance tolerance, and contacts 36 and 50 are in engagement approximately 37% of the time.

Fig. 5 illustrates a condition in which there is some unbalance, but the unbalance is within the maximum unbalance tolerance limits. Under these conditions contact 36 does not engage contact 50, inasmuch as contact 50 automatically centers itself about the motion of contact 36. In Fig. 5 the movement of contact 36 is illustrated by the line 58b.

Referring again to Fig. 1 an indicating means 60 is provided for indicating conditions of operation in the balancing machine. While such means is illustrated as a lamp it will be understood that various other indicating means might be utilized if desired. The lamp 60 is connected in a circuit comprising leads 61 and 62 which are connected to terminals 63 and 64, these terminals being adapted to be connected to an electrical supply here illustrated as an alternating current generator 65, a conventional commercial 115 volt regulated A.C. source preferably being utilized.

A switch 66 is in the lead 61 in series with the lamp 60. An electromagnetic switch operating means comprising a relay coil 67 is provided for operating the switch 66, and an actuating circuit for the coil 67 includes a transformer 70 having a primary 71 connected across the terminals 63 and 64 and a secondary 72. One side of the secondary is connected to the primary contact 36 by means of a lead 73 and a flexible connection 73a. The other side of the secondary is connected through a rectifying and filtering circuit to one side of the coil 67. The rectifying and filtering circuit comprises a selenium rectifier 75 and a plurality of resistors 76 to 80 connected in series. These resistors may have respective values of 33 ohms, 2,000 ohms, 10,000 ohms, 25,000 ohms (maximum) and 18,000 ohms. A filter condenser 81, which may have a value of 40 microfarads, is connected between ground and a point between resistors 76 and 77, and a voltage regulating tube 82, which may be of type VR105, is connected between ground and point intermediate resistors 77 and 78. The actuating circuit is completed by a lead 83 and flexible connection 83a which connects the other side of the coil 67 with secondary contact 50. In order to control the operation of the switch operating means as a function of the time percentage during which the actuating circuit is closed an electrical storage device comprising a condenser 85 (which may have a value of 4 microfarads) is connected across that portion of the actuating circuit including the coil 67 and the resistor 80.

In the operation of the apparatus, the actuating circuit is closed periodically for time durations proportional to the amount of unbalance in the operation of the balancing machine. Under the conditions illustrated in Fig. 3, where the unbalance is considerably in excess of the maximum unbalance tolerance, the actuating circuit is closed for such a proportion of the time that a sufficient charge is maintained on the storage condenser 85 to keep the relay continuously energized so that switch 66 is open and lamp 60 is out. If no electrical storage means were provided in the actuating circuit the relay would tend to become de-energized during the period when contacts 36 and 50 are out of engagement, and the lamp might flicker. The charge which is built up across the condenser 85 during the time when the actuating circuit is closed (the shaded portion of Fig. 3) is sufficient to hold the relay in during the time the actuating circuit is open (the unsheded portion of Fig. 3). Since the balancing machine may operate at approximately 400 R. P. M. a sensitive relay is preferred. If the unbalance conditions are such that the maximum unbalance tolerance is only slightly exceeded, as is graphically illustrated in Fig. 4, the charge on the condenser 85 fluctuates so that the relay is actuated and released each half revolution of the machine, and the lamp flickers on and off indicating that, while the work piece is not in balance, it is close to the unbalance tolerance limit. In the event the work piece is brought within the unbalance tolerance limit the actuating circuit is never closed, as illustrated graphically in Fig. 5, and the lamp remains lit. For different unbalance tolerance limits the screw 42 may be adjusted to change the width of contact 36.

Fig. 6 shows a modified form of circuit for the invention, wherein the relay of Fig. 1 is eliminated. In Fig. 6 primary contact 36 is connected to one terminal 64a of a voltage source, the other terminal 63a being connected to one side of a lamp 60a having its other side connected through a current limiting resistor 87 to the contact 50. A storage condenser 85a is connected across the lamp 60a. The lamp 60a preferably is a neon or other glow discharge type lamp. With an incandenscent type lamp the indication would be largely a question of lamp brilliance because the lamp filament would remain hot after the circuit was broken. Furthermore, an incandescent lamp in series with contacts 36, 50 would require a current of the order of .06 ampere, which would make arcing across the contacts probable.

While Fig. 6 is of simpler construction than Fig. 1 and will operate in generally the same manner, the arrangement shown in Fig. 1 is advantageous in that an incandescent lamp is more brilliant than a neon lamp and therefore provides a better visual indication.

While I have shown and described two embodiments of my invention, it is capable of many modifications. Changes therefore, in the construction and arrangement may be made without departing from the spirit and scope of the invention as set forth in the appended claims.

I claim:

1. Apparatus of the character described for indicating conditions of operation in a balancing machine, including: indicating means; an energized circuit including a switch for energizing said indicating means; electromagnetic operating means for said switch; an energized actuating circuit for said switch operating means; movable contact means in said actuating circuit, said contact means having a portion connected to said machine and movable in accordance with the amount of unbalance in the operation thereof to close said actuating circuit periodically for time durations increasing with the amount of unbalance; and a condenser connected across said switch operating means to control the operation of said switch operating means as a function of time duration during which said actuating circuit is closed.

2. Apparatus of the character described for indicating conditions of operation in a balancing machine, including: indicating means; a circuit for energizing said indicating means; a first contact in said circuit; means rigidly connecting said contact to the machine to cause movement of said contact a distance proportional to the amount of unbalance in the operation of said machine; and a second, freely movable contact in said circuit having parts straddling said first contact and movable in either of two opposite directions by said first contact, said first contact being movable in response to unbalance in the operation of said machine to close said circuit by engagement with said second contact upon movement in either direction.

3. Apparatus of the character claimed in claim 2, wherein the parts of said second contact which straddle said first contact are further apart than the width of the first contact so that said first contact may move a short distance without engaging either part of the second contact.

4. Apparatus of the character claimed in claim 2, wherein the distance between the straddling parts of the second contact is greater than the width of the first contact in an amount slightly less than the maximum limit of movement of said first contact due to maximum unbalance tolerance.

5. Apparatus of the character claimed in claim 2, including means for adjusting the width of one of said contacts.

6. Apparatus of the character claimed in claim 2, wherein said first contact has spaced portions, and wherein there are means for moving said portions toward and away from each other to change the overall width of said contact.

7. Apparatus of the character described for indicating conditions of operation in a balancing machine, including: indicating means; a circuit including switch means for energizing said indicating means; operating means for said switch means; an actuating circuit for said switch operating means; a first contact in said actuating circuit; means rigidly connecting said contact to the machine to cause movement of said contact a distance proportional to the amount of unbalance in the operation of said machine; and a second freely movable contact in said actuating circuit having parts straddling said first contact and movable in either of two opposite directions by said first contact, said first contact being movable in response to unbalance in the operation of said machine to close said actuating circuit by engagement with said second contact upon movement in either direction.

8. Apparatus of the character described for indicating conditions of operation in a balancing machine, including: indicating means; a circuit including switch means for energizing said indicating means; operating means for said switch means; an actuating circuit for said switch operating means; a first contact in said actuating circuit; means rigidly connecting said contact to the machine to cause movement of said contact a distance proportional to the amount of unbalance in the operation of said machine; a second freely movable contact in said actuating circuit having parts straddling said first contact and movable in either of two opposite directions by said first contact, said first contact being movable in response to unbalance in the operation of said machine to close said actuating circuit by engagement with said second contact upon movement in either direction; and electrical storage means connected across said switch operating means to control the operation thereof as a function of the time duration during which said actuating circuit is closed.

9. Apparatus of the character claimed in claim 8, wherein said first contact has spaced portions, and wherein there is an adjustable device connected between said spaced portions for moving said portions toward and away from each other to change the overall width of said contact.

References Cited in the file of this patent

UNITED STATES PATENTS

| | | |
|---|---|---|
| 1,340,788 | O'Hara | May 18, 1920 |
| 1,496,875 | Field | June 10, 1924 |
| 1,976,588 | Thearle | Oct. 9, 1934 |
| 2,074,840 | Greentree | Mar. 23, 1937 |
| 2,077,390 | Blau | Apr. 20, 1937 |
| 2,144,873 | Dimond | Jan. 24, 1939 |
| 2,328,114 | Weaver et al. | Aug. 31, 1943 |
| 2,361,349 | Frazier | Oct. 24, 1944 |
| 2,412,473 | Schnoebelen | Dec. 10, 1946 |
| 2,488,670 | Koenig | Nov. 22, 1949 |
| 2,548,809 | Norman | Apr. 10, 1951 |
| 2,616,288 | Mesa | Nov. 4, 1952 |